United States Patent [19]

Kawa

[11] 4,155,072

[45] May 15, 1979

[54] CHARACTER RECOGNITION APPARATUS

[75] Inventor: Ryuichi Kawa, Tokyo, Japan

[73] Assignee: Ricoh Company, Ltd., Tokyo, Japan

[21] Appl. No.: 860,294

[22] Filed: Dec. 14, 1977

[30] Foreign Application Priority Data

| Dec. 17, 1976 | [JP] | Japan | 51-151782 |
| Dec. 23, 1976 | [JP] | Japan | 51-155563 |
| Dec. 23, 1976 | [JP] | Japan | 51-155564 |
| Dec. 23, 1976 | [JP] | Japan | 51-155565 |

[51] Int. Cl.$^2$ .............................................. G06K 9/12
[52] U.S. Cl. .................... 340/146.3 H; 340/146.3 AC
[58] Field of Search ............. 340/146.3 H, 146.3 AC, 340/146.3 AE, 146.3 J, 146.3 R, 146.3 MA

[56] References Cited

U.S. PATENT DOCUMENTS

| 3,346,845 | 10/1967 | Fomenko | 340/146.3 AC |
| 3,347,981 | 10/1967 | Kagan et al. | 340/146.3 H |
| 3,462,737 | 8/1969 | Malaby | 340/146.3 H |
| 3,710,323 | 1/1973 | Andrews et al. | 340/146.3 H |
| 3,873,972 | 3/1975 | Levine | 340/146.3 AC |
| 3,967,243 | 6/1976 | Kawa | 340/146.3 H |

FOREIGN PATENT DOCUMENTS

1253302 11/1971 United Kingdom .......... 340/146.3 AC

OTHER PUBLICATIONS

Min et al., "Character Rec. Employing Fourier Transform...", *IBM Tech. Dis. Bulletin*, vol. 15, No. 12, May, 1973, pp. 3875–3878.

*Primary Examiner*—Leo H. Boudreau
*Attorney, Agent, or Firm*—David G. Alexander

[57] ABSTRACT

A character is scanned in a plurality of parallel scan lines and the starting and ending positions of the character in the respective scan lines are detected. The portions of the character between the starting and ending positions of the respective scan lines are quantized and classified into a code. The starting and ending positions and classification codes are compared with those of standard character patterns and the character is recognized as the standard character with the closest correlation. This operation corresponds to tracing the right and left outlines of the character, and further classifying the interior of the character. Means are provided for normalizing the horizontal size, position and slant of the character prior to correlation. An improved quadratic correlation function is disclosed which selectively utilizes root mean square values of positive and negative projection components of a characteristic vector of a covariance matrix of a standard character pattern.

14 Claims, 38 Drawing Figures

| Pi | CLASSIFICATION |
|---|---|
| 0 |  |
| 1 |  |
| 2 |  |
| 3 |  |
| 4 |  |
| 5 |  |
| 6 |  |
| 7 |  |
| 8 |  |
| 9 |  |
| A |  |
| B |  |
| C |  |
| D |  |
| E |  |
| F |  |

Fig. 7
Fig. 8
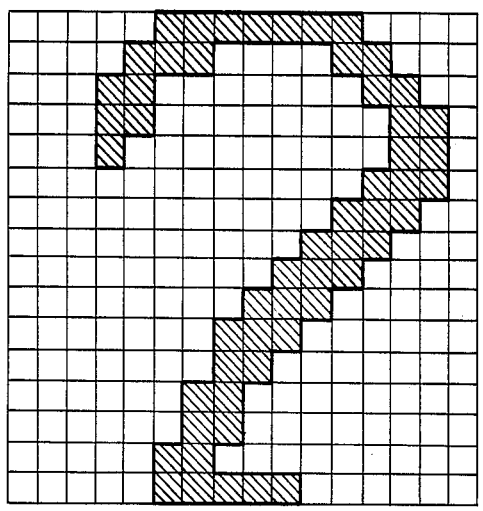
| i | S(i) | E(i) | P(i) |
|---|---|---|---|
| 1 | 6 | 12 | F |
| 2 | 5 | 13 | 1 |
| 3 | 4 | 14 | 0 |
| 4 | 4 | 15 | 0 |
| 5 | 4 | 15 | 0 |
| 6 | 13 | 15 | F |
| 7 | 12 | 14 | F |
| 8 | 11 | 13 | F |
| 9 | 10 | 12 | F |
| 10 | 9 | 11 | F |
| 11 | 8 | 10 | F |
| 12 | 8 | 9 | F |
| 13 | 7 | 8 | F |
| 14 | 7 | 8 | F |
| 15 | 6 | 7 | F |
| 16 | 6 | 7 | F |
Fig. 9
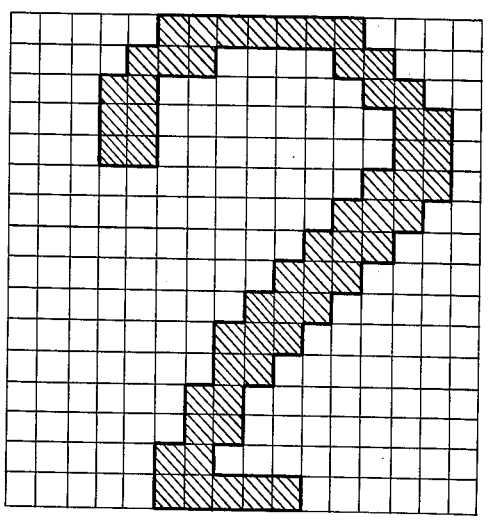
Fig. 10a
2   2   2
Fig. 10b
2   2   2
Fig. 10c
2   2   2

| i | S(i) | E(i) | P(i) |
|---|---|---|---|
| 1 | 6 | 10 | F |
| 2 | 6 | 11 | 8 |
| 3 | 11 | 11 | F |
| 4 | 11 | 11 | F |
| 5 | 10 | 11 | F |
| 6 | 9 | 10 | F |
| 7 | 8 | 9 | F |
| 8 | 7 | 8 | F |
| 9 | 6 | 7 | F |
| 10 | 5 | 6 | F |
| 11 | 5 | 5 | F |
| 12 | 4 | 5 | F |
| 13 | 3 | 4 | F |
| 14 | 3 | 4 | F |
| 15 | 3 | 4 | F |
| 16 | 3 | 14 | F |

| i | $S_1(i)$ | $E_1(i)$ | $D(i)$ | $D_1(i)$ | $D_2(i)$ | $S_2(i)$ | $E_2(i)$ |
|---|---|---|---|---|---|---|---|
| 1 | 3 | 2 | 3 | 3 | 2.0 | 3.0 | 12.0 |
| 2 | 3 | 3 | 3 | 3 | 2.0 | 3.0 | 14.0 |
| 3 | -2 | 3 | 3 | 3 | 2.0 | 13.0 | 14.0 |
| 4 | -2 | 3 | 3 | 3 | 2.0 | 13.0 | 14.0 |
| 5 | -1 | 3 | 3 | 3 | 2.0 | 11.0 | 14.0 |
| 6 | -1 | 2 | 3 | 3 | 2.0 | 9.0 | 12.0 |
| 7 | -1 | 1 | 2 | 3 | 1.5 | 7.5 | 9.5 |
| 8 | -1 | 0 | 2 | 4 | 1.5 | 6.0 | 8.0 |
| 9 | 2 | 0 | 3 | 4 | 1.5 | 5.4 | 6.8 |
| 10 | 3 | -1 | 4 | 5 | 1.2 | 5.0 | 6.0 |
| 11 | 4 | -2 | 4 | 6 | 1.0 | 5.0 | 5.0 |
| 12 | 5 | -3 | 5 | 6 | 1.0 | 4.0 | 5.0 |
| 13 | 6 | -3 | 6 | 6 | 1.0 | 3.0 | 4.0 |
| 14 | 6 | -4 | 6 | 6 | 1.0 | 3.0 | 4.0 |
| 15 | 6 | -4 | 6 | 6 | 1.0 | 3.0 | 4.0 |
| 16 | 6 | 6 | 6 | 6 | 1.0 | 3.0 | 14.0 |

$S_1(i) = 9 - S(i)$
$E_1(i) = E(i) - 8$
$D(i) = \text{MAX}\{S_1(i), E_1(i)\}$
$D_1(i) = \text{MAX}\{D(i-3), D(i-2), D(i-1), D(i), D(i+1), D(i+2), D(i+3)\}$
$D_2(i) = 6 / D_1(i)$
$S_2(i) = 9 - D_2(i) \cdot S_1(i)$
$E_2(i) = D_2(i) \cdot E_1(i) + 8$ Fig. 17
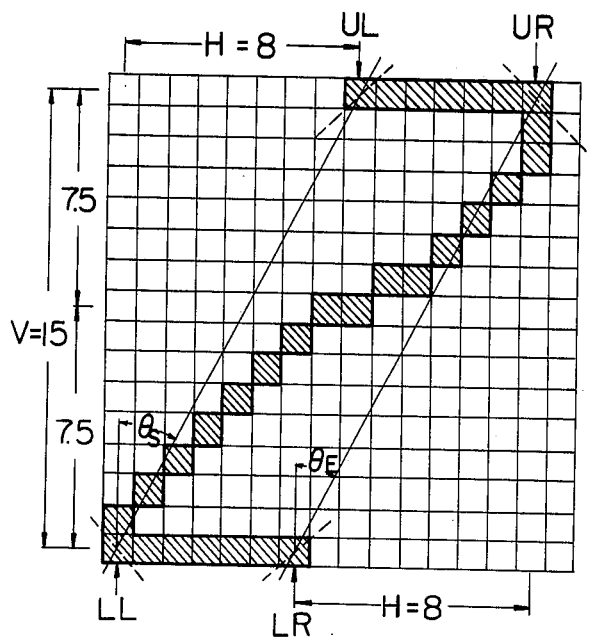
Fig. 18
| i | X(i) | S(I) | E(I) | P(i) |
|---|------|------|------|------|
| 1 | 4 | 9 | 15 | F |
| 2 | 3.5 | 15 | 15 | F |
| 3 | 2.9 | 15 | 15 | F |
| 4 | 2.4 | 14 | 14 | F |
| 5 | 1.9 | 13 | 13 | F |
| 6 | 1.3 | 12 | 12 | F |
| 7 | 0.8 | 10 | 11 | F |
| 8 | 0.3 | 8 | 9 | F |
| 9 | -0.3 | 7 | 7 | F |
| 10 | -0.8 | 6 | 6 | F |
| 11 | -1.3 | 5 | 5 | F |
| 12 | -1.9 | 4 | 4 | F |
| 13 | -2.4 | 3 | 3 | F |
| 14 | -2.9 | 2 | 2 | F |
| 15 | -3.5 | 1 | 1 | F |
| 16 | -4 | 1 | 7 | F |
Fig. 19
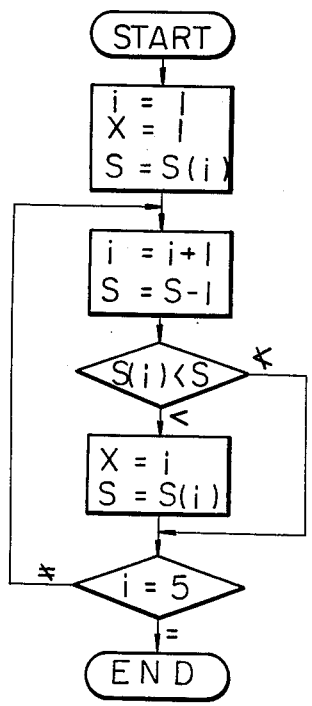
Fig. 20
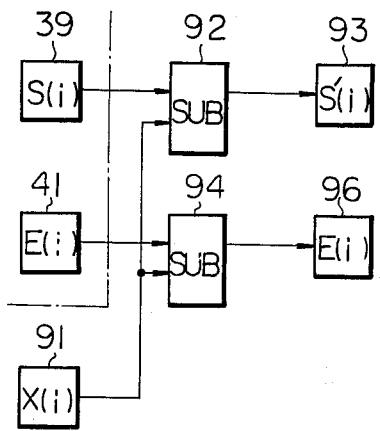

Fig. 21
| i | S'(i) | E'(i) | P(i) |
|---|---|---|---|
| 1 | 5.0 | 11.0 | F |
| 2 | 11.5 | 11.5 | F |
| 3 | 12.1 | 12.1 | F |
| 4 | 11.6 | 11.6 | F |
| 5 | 11.1 | 11.1 | F |
| 6 | 10.7 | 10.7 | F |
| 7 | 9.2 | 10.2 | F |
| 8 | 7.7 | 8.7 | F |
| 9 | 7.3 | 7.3 | F |
| 10 | 6.8 | 6.8 | F |
| 11 | 6.3 | 6.3 | F |
| 12 | 5.9 | 5.9 | F |
| 13 | 5.4 | 5.4 | F |
| 14 | 4.9 | 4.9 | F |
| 15 | 4.5 | 4.5 | F |
| 16 | 5.0 | 11.0 | F |
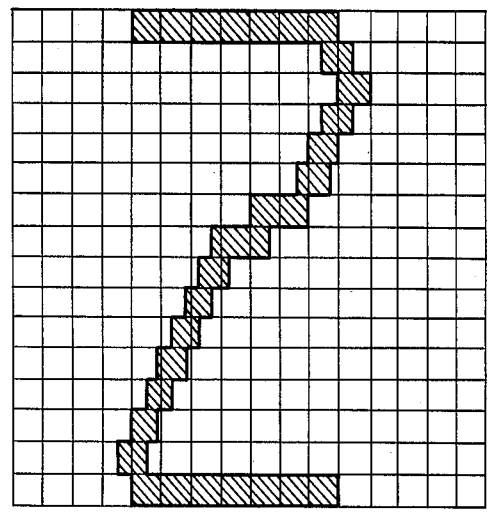
Fig. 22
Fig. 23
| i | S''(i) | E''(i) | P(i) |
|---|---|---|---|
| 1 | 3 | 9 | F |
| 2 | 2 | 10 | 1 |
| 3 | 1 | 11 | 0 |
| 4 | 1 | 12 | 0 |
| 5 | 1 | 12 | 0 |
| 6 | 10 | 12 | F |
| 7 | 9 | 11 | F |
| 8 | 8 | 10 | F |
| 9 | 7 | 9 | F |
| 10 | 6 | 8 | F |
| 11 | 5 | 7 | F |
| 12 | 5 | 6 | F |
| 13 | 4 | 5 | F |
| 14 | 4 | 5 | F |
| 15 | 3 | 4 | F |
| 16 | 3 | 7 | F |
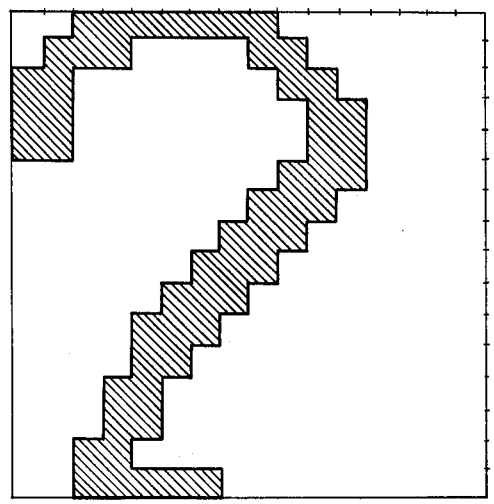
Fig. 24

CHARACTER RECOGNITION APPARATUS

BACKGROUND OF THE INVENTION

The present invention relates to an improved character recognition apparatus. The handling of mail, bank checks and the like is speeded up by a tremendous extent by optoelectronically reading and processing characters on the documents. In the case of mail sorting, a character recognition apparatus reads the zip codes on the envelopes and automatically routes the mail to the correct carrier.

Such character recognition apparatus generally functions to optoelectronically scan a character in a rectangular pattern of lines and produce quantized, binary electronic signals corresponding to the character pattern. The quantized character pattern is stored in a memory and compared on a bit to bit basis with character patterns of standard characters. The unknown character is defined to correspond to the standard character producing the closest correlation.

The major problem in character recognition occurs where it is required to recognize handwritten characters. Since each person has a different way of writing a particular letter or number, the correlation between a handwritten character and the corresponding standard character varies to the extent that characters are often erroneously recognized as different characters. For example, where the number "8" is written in such a manner that the lower portion thereof is significantly smaller than the upper portion thereof, it is often incorrectly recognized as the number "9."

Various preprocessing operations are usually performed prior to the recognition step to normalize the size, position and slant of the character and thereby increase the correlation. However, prior art character recognition devices still produce frequent errors in recognizing handwritten characters and require a very large memory for storing the character patterns. In order to enable horizontal normalization of a character pattern, a memory having a horizontal size equal to twice the actual horizontal character size is often provided, adding unnecessarily to the size and cost of the apparatus.

A function widely used in character recognition is known in the art as a quadratic identification or correlation function. While such a function produces accurate recognition of normal characters, the correlation is far from satisfactory where the characters are distorted from their normal shape.

SUMMARY OF THE INVENTION

The present invention overcomes the drawbacks of the prior art by electronically tracing the outlines of the opposite sides of a character and further producing a classification code representing the interior of the character. Character recognition is made on the basis of these parameters rather than on a bit by bit comparison with standard patterns. The correlation process is greatly improved by a quadratic correlation function which selectively utilizes root mean square values of positive and negative projection components of a characteristic vector of a convariance, matrix of a standard character pattern.

It is an object of the present invention to provide a character recognition apparatus which enables more accurate character recognition than comparable apparatus known heretofore.

It is another object of the present invention to provide a character recognition apparatus which has greatly reduced memory requirements.

It is another object of the present invention to provide an improved quadratic correlation function and means for embodying the operation of the function, said means constituting a novel subcombination of the present invention.

It is another object of the present invention to provide a generally improved character recognition apparatus.

Other objects, together with the foregoing, are attained in the embodiments described in the following description and illustrated in the accompanying drawing.

BRIEF DESCRIPTION OF THE DRAWING

FIG. 7 is a diagram of a character for recognition;

FIG. 8 is a chart of detected parameters of the character;

FIG. 9 is similar to FIG. 7 but shows the character reproduced by inverse recognition;

FIGS. 10a to 10c are diagrams illustrating distorted characters;

FIG. 17 is a diagram of a slanted character "2";

FIG. 18 is a chart of detected parameters of the character of FIG. 17;

FIG. 19 is a flowchart illustrating the operation of a slant normalization means of the invention;

FIG. 20 is a block diagram further illustrating the operation of the slant normalization means;

FIG. 21 is a chart illustrating slant normalized parameters of the character of FIG. 17;

FIG. 22 is a diagram illustrating the character of FIG. 17 with the slant thereof normalized;

FIG. 23 is a chart illustrating parameters of the character of FIG. 9 with the horizontal position thereof normalized;

FIG. 24 is a diagram illustrating the character of FIG. 9 with the horizontal position thereof normalized;

DESCRIPTION OF THE PREFERRED EMBODIMENTS

While the character recognition apparatus of the invention is susceptible of numerous physical embodiments, depending upon the environment and requirements of use, substantial numbers of the herein shown and described embodiments have been made, tested and used, and all have performed in an eminently satisfactory manner.

Figure 1A:
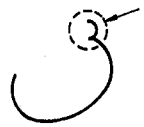
FIGS. 1a to 1d are diagrams illustrating the principles of the present invention.
Figure 1B:
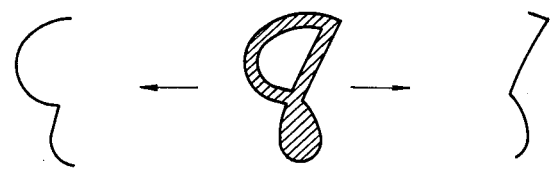
Figure 1C:
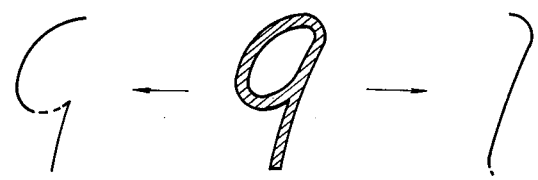
Figure 1D:

FIGS. 1a to 1d of the drawing illustrate various characters which are correctly recognized by a character recognition apparatus of the present invention. FIG. 1a shows the number "3" with the upper portion thereof much smaller than the lower portion. FIG. 1b shows the number "8" with the lower portion thereof collapsed, or less wide than the upper portion. Such a character is often erroneously recognized as the number "9" which is shown in FIG. 1c. FIG. 1d illustrates two versions of the number "3" which differ greatly in line thickness.

FIGS. 1b and 1c further illustrate the left and right outlines of the respective characters obtained by tracing the right and left sides of the characters. It will be seen that the shapes of these outlines differ considerably from each other. The present invention functions to electronically trace the outlines of opposite sides of characters and utilize the shapes obtained for character recognition, thereby greatly increasing the reliability.

Figure 2A:
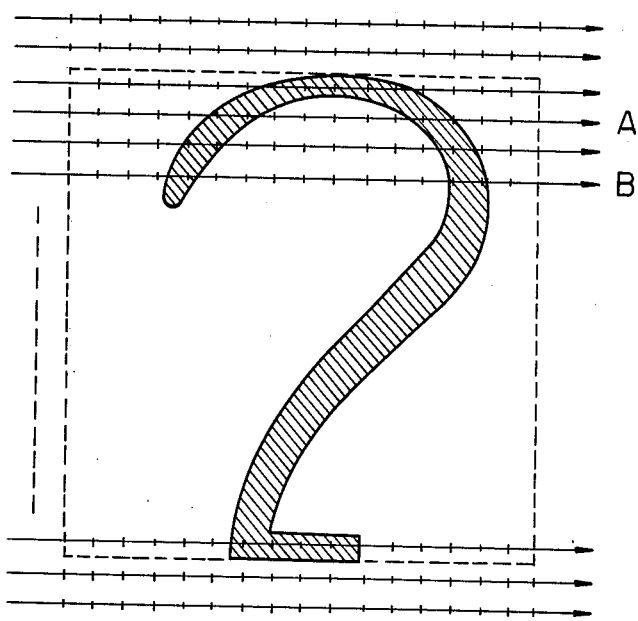
FIGS. 2a to 2c are diagrams illustrating the operation of the invention.

FIG. 2a shows how a character "2" having an abnormally narrow lower portion is electronically scanned by a flying spot scanner or the like which is not illustrated. The scanning is performed in a rectangular pattern of parallel horizontal lines as illustrated, from top to bottom, left to right. For simplicity of illustration it will be assumed that the scanning area is divided into 16 rows, each having 16 equal areas. The entire scanning area is thereby represented by a total of 256 individual areas, and can be considered as a rectangular matrix or vector of $n=256$ elements. The scanning unit functions to quantize the character pattern in each of the areas to obtain a logically high or "1" electrical signal where the portion of the character in the respective area occupies more space than the background and a logically low or "0" electrical signal where the background occupies more space.

Figure 2B:
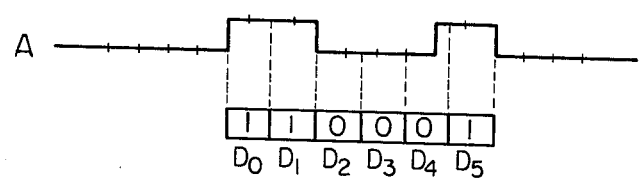
Figure 2C:
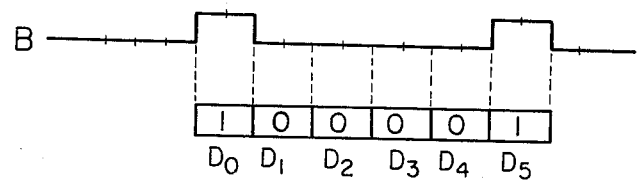

In accordance with the present invention, the starting and ending positions in each scan line are detected and the portion of the scan line between the starting and ending positions is equally divided into 6 areas. The starting and ending positions are designated as $S(i)$ and $E(i)$ respectively, where i is the number of the scan line counted from the top ($i=1 \sim 16$). The 6 equal areas are quantized to produce a classification byte consisting of 6 bits D0 to D5. Since the bits D0 and D5 are always logically high, they are redundant and omitted from the classification byte. Thus, the classification byte utilized consists of the four bits D1 to D4. Each scan line is represented by the starting and ending positions $S(i)$ and $E(i)$ respectively and a classification code $P(i)$ derived from the classification bits D1 to D4. FIG. 2a illustrates scan lines designated as A and B. FIGS. 2b and 2c illustrate the classification bits D0 to D5 for the scan lines A and B respectively. For the scan line A, the starting position of the character is $S(i)=5$, the ending position $E(i)=13$ and the classification bits are binary 1000. For the scan line B, the starting position is $S(i)=4$, the ending position is $E(i)=15$ and the classification bits D1 to D4 are binary 0000.

Figure 3:
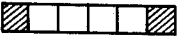
FIG. 3 is a chart of classification codes of the invention.
Figure 3:
Figure 3:
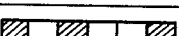
Figure 3:
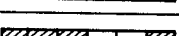
Figure 3:
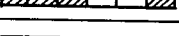
Figure 3:
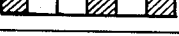
Figure 3:
Figure 3:
Figure 3:
Figure 3:
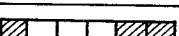
Figure 3:
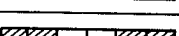
Figure 3:
Figure 3:
Figure 3:
Figure 3:
Figure 3:
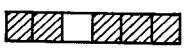

FIG. 3 shows how the classification code $P(i)$ is derived from the classification bits D1 to D4 through binary to hexadecimal conversion. For the scan line A, the classification code is $P(i)=1$. For the scan line B, the classification code is $P(i)=0$. FIG. 8 illustrates the entire representation of the character of FIG. 2a which is shown in quantized form in FIG. 7. FIG. 9 shows the character pattern reproduced by inverse recognition using the chart of FIG. 8, which differs from the original character of FIG. 7 only by the addition of an extra dark area indicated by an arrow.

The starting point $S(i)$ may be detected by means of a counter which counts the areas of the scan line and a latch circuit which is actuated to latch the count of the first logically high area, although not shown. Similarly, another counter may be latched to store the count of the last logically high area to detect the ending position $E(i)$.

Figure 4:
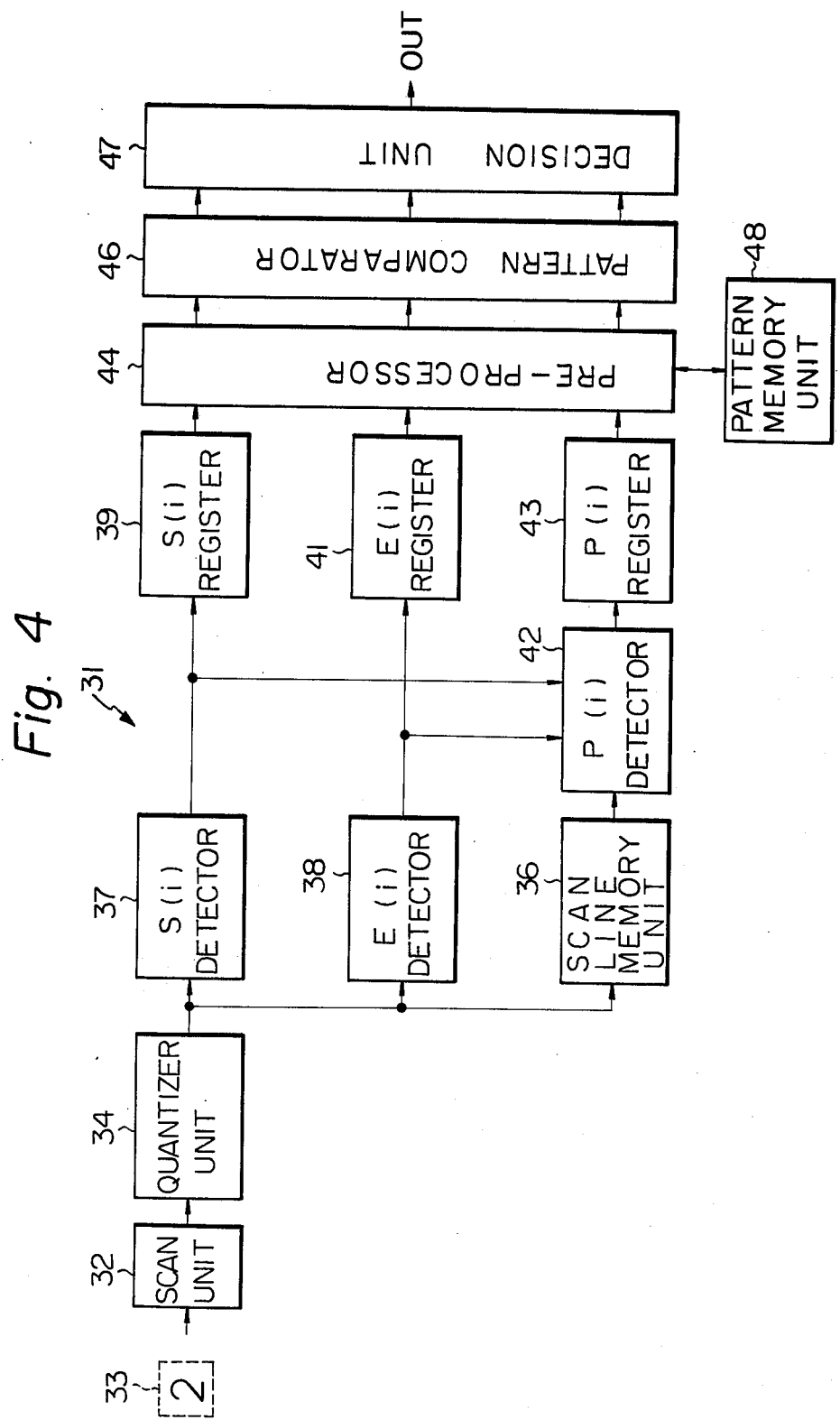
FIG. 4 is a block diagram of a character recognition apparatus embodying the present invention.

FIG. 4 illustrates a complete character recognition apparatus embodying the present invention which is generally designated as 31 and comprises a scan unit 32 such as a flying spot scanner. The unit 32 scans a character, illustrated as a distorted "2," printed on a document 33 such as an envelope or a bank check. The 16 individual areas of each scan line are quantized by a quantizer unit 34 to produce the electronic character pattern which is stored in a 16 bit scan line memory unit 36. The starting points $S(i)$ and ending points $E(i)$ of each scan line are detected by an $S(i)$ detector 37 and an $E(i)$ detector 38 and stored in 6 bit $S(i)$ and $E(i)$ registers 39 and 41 respectively for processing. The classification code $P(i)$ is detected by a $P(i)$ detector 42 and stored in a six bit $P(i)$ register 43. The parameters $S(i)$, $E(i)$ and $P(i)$ for each scan line are processed by a pre-processor 44 so as to normalize the character for horizontal size, position and slant. The normalized character pattern is fed into a pattern comparator 46 which compares the values of $S(i)$, $E(i)$ and $P(i)$ with corresponding values of standard character patterns, corresponding to standard numbers, letters, etc. A decision unit 47 recognizes the character as the standard character having the closest correlation of the values of $S(i)$, $E(i)$ and $P(i)$. The entire pattern as represented by the values of $S(i)$, $E(i)$ and $P(i)$ is stored in a pattern memory unit 48 which makes said values available to the pre-processor 44 for character normalization.

In addition to substantially improving the reliability of character recognition, the present apparatus 31 substantially reduces the amount of memory required to store the pattern in the unit 48. In actual practice, a character is scanned in a $32 \times 32$ matrix rather than $16 \times 16$ as described herein. In order to enable horizontal normalization, the pattern memory unit in a prior art character recognition apparatus has a capacity equal to twice the width of the character scan area to allow for horizontal shifting of the character pattern. Thus, the memory requirements are $64 \times 32$ or 2048 bits.

In accordance with the present invention, it is unnecessary for the reasons described hereinbelow to provide the memory with double width capacity. Since each scan line is completely represented by a 6 bit code $S(i)$, a 6 bit code $E(i)$ and a 4 bit code $P(i)$, or 16 bits, the total memory requirement is only 512 bits. The memory requirement is thereby reduced by a factor of 75%.

The present invention further reduces the circuitry required horizontal size, position and slant normalization since such normalization may be accomplished through alteration of the values of S(i), E(i) and P(i) without shifting of the character pattern in memory.

Figure 5:
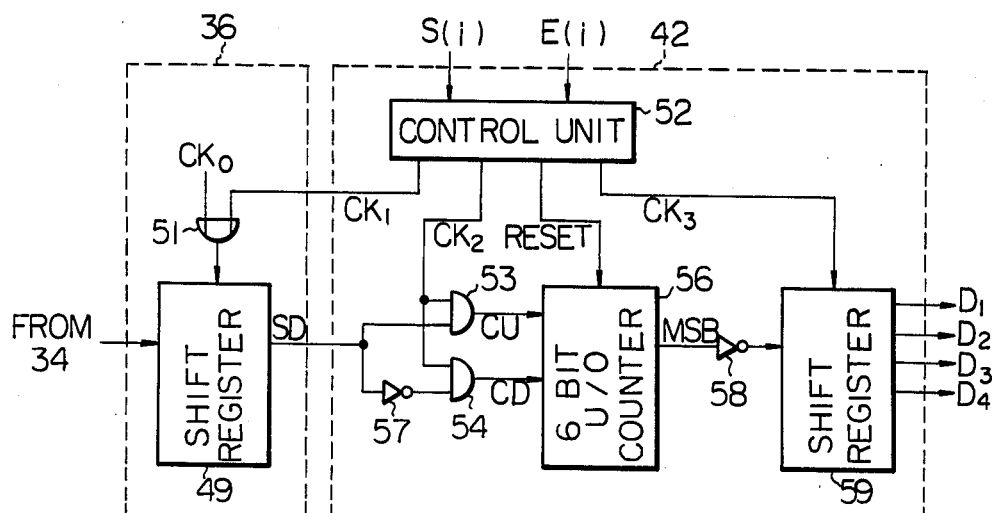
FIG. 5 is a block diagram of a classification code detector of the invention.

FIG. 5 illustrates an exemplary embodiment of the scan line memory unit 36 and the P(i) detector 42. The unit 36 comprises a 16 bit shift register 49 which has an input connected to the output of the quantizer unit 34. The output of an OR gate 51 is connected to a shift input of the register 49. Inputs of the OR gate 51 are connected to receive clock pulses CK0 from the quantizer unit 34 and clock pulses CK1 from a control unit 52 of the detector 42. Inputs of AND gates 53 and 54 are connected to receive clock pulses CK3 from the control unit 52. Outputs of the AND gates 53 and 54 are connected to count-up (CU) and count-down (CD) inputs of a 6 bit up-down counter 56. The output of the shift register 49, designated as SD, is connected directly to an input of the AND gate 53 and through an inverter 57 to an input of the AND gate 54. An output (MSB) of the counter 56 is connected through an inverter 58 to an input of a 6 bit shift register 59. The bits D1 to D4 are fed in parallel to the P(i) register 43 from the shift register 59. The shift input of the shift register 59 is connected to receive clock pulses CK3 from the control unit 52. The starting and ending positions S(i) and E(i) are applied to the control unit 52 from the detectors 37 and 38 respectively.

Figure 6:
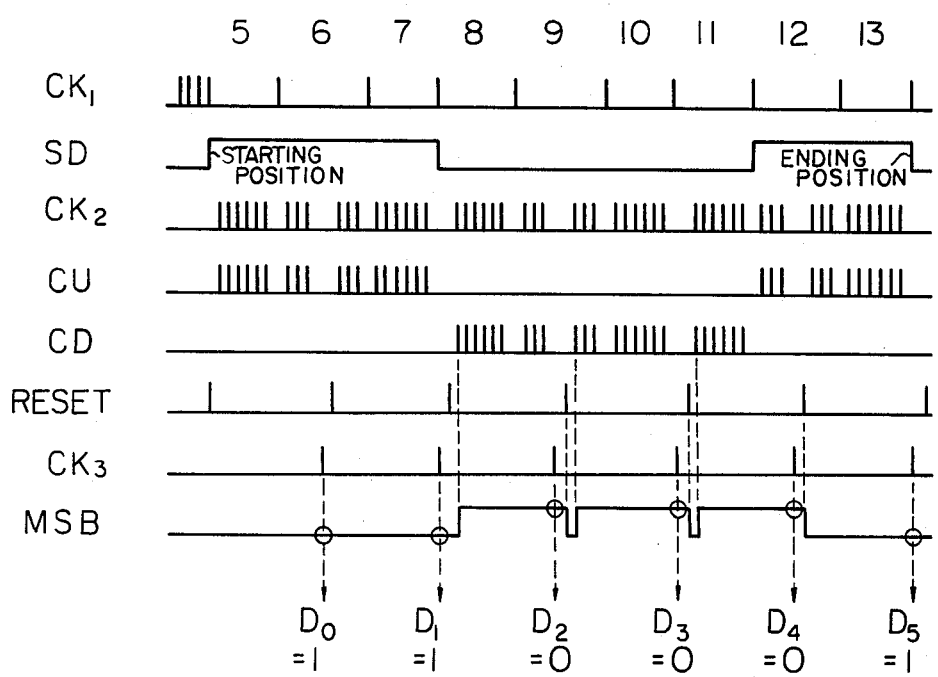
FIG. 6 is a timing chart illustrating the operation of the classification code detector.

In operation, the 16 bits representing a scan line are shifted into the shift register 49 in synchronism with the clock pulses CK0 and the P(i) detection process is performed prior to scanning the next line. FIG. 6 illustrates the detection process for the scan line A of FIGS. 2a and 2b. Four clock pulses CK1 are applied to the shift register 49 to shift out the first 4 bits, so that the starting position bit constitutes the serial output of the register 49. In this case, S(A)=5, so the 5th bit constitutes the output of the register 49.

Subsequently, within a predetermined length of time, 9 clock pulses CK1 and 6 clock pusles CK3 are applied to the shift register 49 and shift register 59 respectively at equal time intervals. Nine clock pulses CK1 are applied so that the 13th bit of the scan line A will constitute the output of the shift register 49 at the end of the predetermined time. It will be noted that E(A)=13. Since the scan line is to be quantized into the 6 bits D0 to D5, six clock pulses CK3 are applied to the shift register 59. Immediately after each clock pulse CK3, a RESET pulse is applied to the counter 56. After each clock pulse CK1, 6 clock pulses are applied to the counter 56 through the AND gates 53 and 54.

The counter 56 functions as an accumulator for quantizing the portion of the scan line A between the starting and ending positions 5 and 13 respectively into the 6 bits D0 to D5. It will be noted that the portion of the scan line A was originally quantized into 9 bits.

Whenever the output of the shift register 49 is logically high, indicating that the respective one of the original 9 bits is logically high, the AND gate 53 is enabled and the clock pulses CK2 are gated therethrough to the counter 56 causing the same to count up. Conversely, if the output SD of the shift register 49 is logically low, the clock pulses CK2 will cause the counter 56 to count down. The output MSB of the counter 56 is logically low when more clock pulses CK2 during an interval between a RESET pulse and subsequent clock pulse CK3 have caused the counter 56 to count up rather than down, and vice-versa. The signal MSB is inverted by the inverter 58 and shifted into the shift register 59 by the clock pulses CK3.

In other words, the clock pulses CK3 divide the portion of the scan line between the starting and ending positions into six equal intervals. The clock pulses CK2 during each interval are algebraically accumulated by the counter 56, which produces a low output signal MSB when more clock pulses CK2 are steered to the up-count input than to the down-count input and vice-versa. Where one of the six equal intervals overlaps two of the 9 equal intervals, and one of the respective nine bits is high and the other low, the clock pulses CK2 produced during the high one of the 9 equal intervals will cause the counter 56 to count up and those during the low one of the 9 equal intervals will cause the counter 56 to count down. The count of the counter 56 will correspond to the algebraic sum of the up and down counts. The signal MSB will be logically low where more up counts occured, and vice-versa. The 6 clock pulses CK3 cause the accumulated signals MSB as inverted by the inverter 58 to be shifted into the shift register 59 to constitute the bits D0 to D5.

FIGS. 10a to 10c show a variety of configurations of the number "2" which vary considerably in horizontal size. It will be noted that the horizontal size varies not only between one character and another but within a particular character itself. For example, the central character in FIG. 10b has an upper portion which is very narrow compared to the lower portion thereof. It is often impossible to recognize such a character with a prior art character recognition apparatus. However, the present apparatus, especially as comprising normalization means which will be described hereinbelow, is able to correctly recognize such a distorted character with high reliability.

Figures 11, 12, 13:
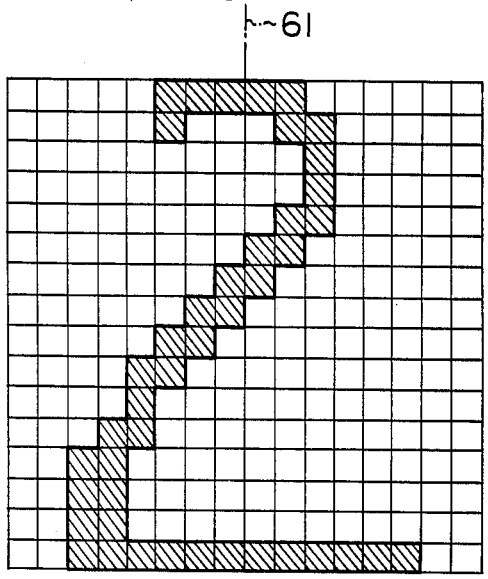
FIG. 11 is a diagram of a distorted character "2"
FIG. 12 is a chart of detected parameters of the character of FIG. 11.
FIG. 13 is a chart illustrating size normalization of the character of FIG. 11.

FIG. 11 shows a distorted character "2" with an abnormally narrow upper portion, and FIG. 12 shows the values of S(i), E(i) and P(i) for the character. The first step in normalizing the horizontal size of the character is to compute a magnification factor D(i) for each scan line. The distance $S_1(i)$ of the starting position S(i) from the center of the character pattern, designated as 61 in FIG. 11, is determined as follows:

$$S_1(i) = 9 - S(i) \tag{1}$$

where the exemplary 16×16 matrix is utilized.
Similarly, the distance $E_1(i)$ of the ending position E(i) from the center 61 is determined as follows:

$$E_1(i) = E(i) - 8 \tag{2}$$

The magnification factor D(i) is taken as the maximum value of $S_1(i)$ and $E_1(i)$, as follows:

$$D(i) = \mathrm{MAX}\{S_1(i), E_1(i)\} \tag{3}$$

However, since the horizontal size has a vertical correlation, it is desirable to compute the magnification factor, taking into the account the scan line adjacent to the scan line in question. Thus, a modified magnification factor $D_1(i)$ is determined as follows:

$$D_1(i) = \mathrm{MAX}\{D(i-j), D(i-j+1) \ldots D(i+j)\} \tag{4}$$

where j is an integer. Where j=3, $D_1(i)$ will be the maximum value of D(i) within a range of 3 scan lines above and below the scan line in question, or the scan line i.

Next, a normalized magnification factor $D_2(i)$ is computed by dividing a standard magnification factor K by the magnification factor $D_1(i)$ as follows:

$$D_2(i) = K/D_1(i) \tag{5}$$

Finally, new or altered starting and ending positions $S_2(i)$ and $E_2(i)$ are calculated as follows:

$$S_2(i) = D_2(i) \times S_1(i) \tag{6}$$

$$E_2(i) = D_2(i) \times E_1(i) \tag{7}$$

Figure 14:
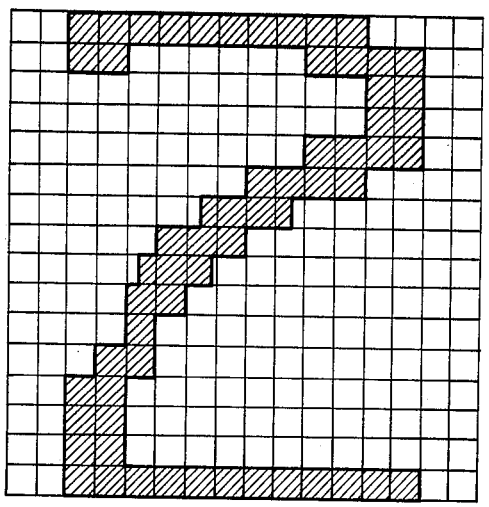
FIG. 14 is a diagram of the character of FIG. 11 with the horizontal size thereof normalized in accordance with the present invention.
Figure 16A:
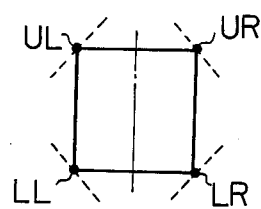
FIGS. 16a to 16d are diagrams illustrated slanted characters.
Figure 16B:
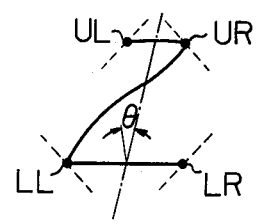
Figure 16C:
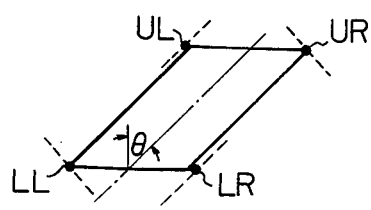
Figure 16D:
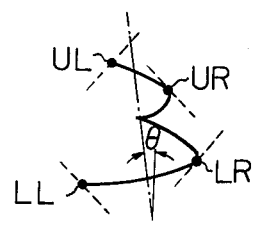

FIG. 13 illustrates the above calculated values for the character pattern of FIGS. 11 and 12 and FIG. 14 illustrates the character with the horizontal size normalized through alteration of the values of S(i) and E(i) to produce the normalized values $S_2(i)$ and $E_2(i)$. The character of FIG. 14 very closely resembles a standard character "2" and can be easily recognized. In this example, $j=3$ and $K=6$.

Figure 15:
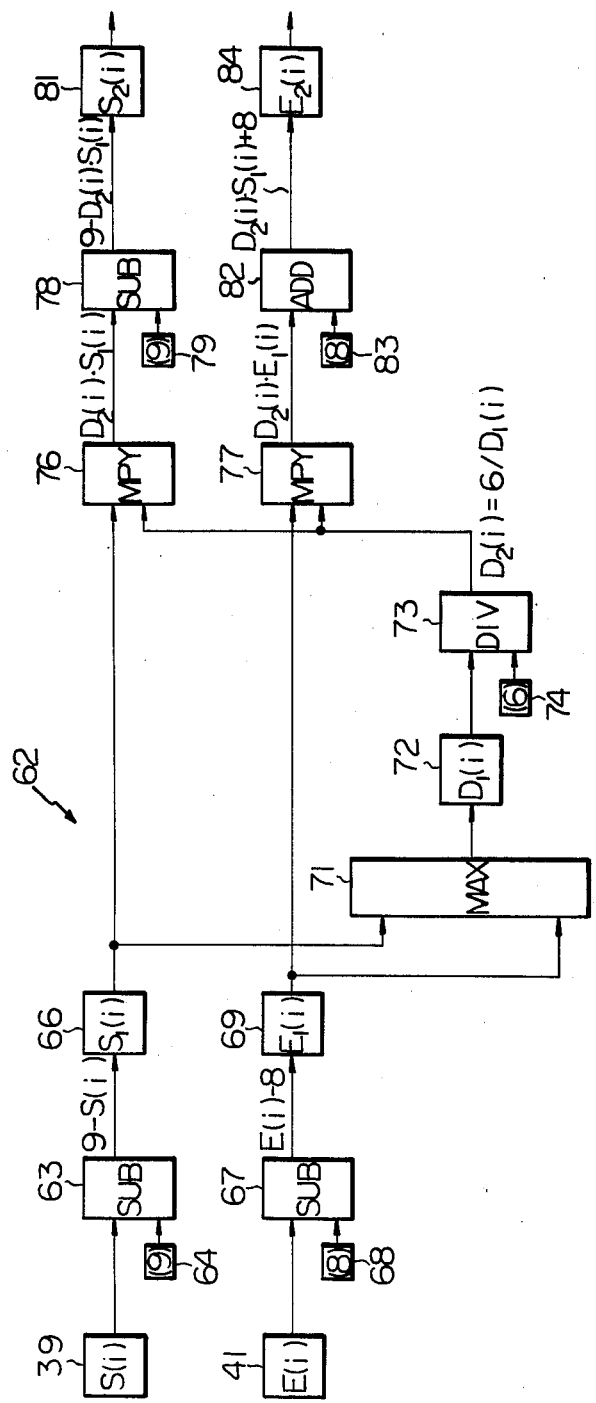
FIG. 15 is a block diagram of a size normalization means of the invention.

FIG. 15 illustrates a horizontal size normalization unit 62 which constitutes part of the pre-processor 44 and is constructed to normalize the horizontal size of a character in accordance with the above method.

The unit 62 comprises a subtractor 63 which subtracts S(i) stored in the register 39 from the constant factor 9 stored in a register 64. The result, $S_1(i)$, is stored in a register 66. In an essentially similar manner, a subtractor 67 subtracts the constant factor 8 stored in a register 68 from E(i) stored in the register 41 to produce $E_1(i)$ which is stored in a register 69. A circuit 71 detects the maximum value of $S_1(i)$ and $E_1(i)$ for the scan line i and the 3 scan lines above and below the scan line i and stores this value, $D_1(i)$, in a register 72. A divider 73 divides the constant value 6 stored in a register 74 by $D_1(i)$ to produce $D_2(i)$ which is applied to multipliers 76 and 77 which multiply $D_2(i)$ by $S_1(i)$ and $E_1(i)$ respectively. The output of the multiplier 76 is subtraced by a subtractor 78 from the constant value 9 stored in a register 79 to produce $S_2(i)$ which is stored in a register 81. An adder 82 adds the constant value 8 stored in a register 83 to the output of the multiplier 77 to produce $E_2(i)$ which is stored in a register 84.

FIGS. 16a to 16d illustrate characters with various average values of slant, as indicated by a slant angle $\theta$. It is especially difficult to recognize the character "0" in FIG. 16c due to the extreme rightward slant. For this reason, it is desirable to normalize the slant of the characters in the pre-processor 44.

FIG. 17 shows the character "2" as slanted rightwardly to a large extent, and FIG. 18 shows the values of S(i), E(i) and P(i) for the character of FIG. 17. It is desired to normalize the slant of the character of FIG. 17 so that it will appear as shown in FIG. 22. This is accomplished in the following manner.

First, upper left and right points UL and UR and lower left and right points LL and LR are determined by translating diagonal lines from the respective corners of the character pattern diagonally inwardly until they just touch the character. For example, the point UL is established by translating a line inclined at 45° to the horizontal from the upper left corner of the character pattern toward the lower right corner thereof until the line first contacts a portion of the character. This is done electronically in a manner which will be described below. Then, a line is drawn connecting the points UL and LL and another line is drawn connecting the points UR and LR. The slant of the lines is determined by dividing the horizontal lengths of the lines by the vertical lengths thereof, and taking the arctangent of the result.

A slant angle $\theta_S$ of the line connecting the points UL and LL, which correspond to starting slant points, and a slant angle $\theta_E$ of the line connecting the points UR and LR, which correspond to ending slant points, are determined and the average value thereof calculated to obtain the average slant value $\theta$.

Where $H_S$ designates the horizontal displacement between the points UL and LL, $H_E$ designates the horizontal displacement between the points UR and LR, $V_S$ designates the vertical displacement between the points UL and LL and $V_E$ designates the vertical displacement between the points UR and LR, the angles $\theta_S$ and $\theta_E$ are determined as follows:

$$\theta_S = \tan^{-1}(H_S/V_S) \tag{8}$$

$$\theta_E = \tan^{-1}(H_E/V_E) \tag{9}$$

The average value of slant $\theta$ is determined as follows:

$$\theta = (\theta_S + \theta_E)/2 \tag{10}$$

As illustrated in FIG. 17, both $H_S$ and $H_E$ equal 8 and both $V_S$ and $V_E$ equal 15. $\theta_S$ and $\theta_E$ equal $\tan^{-1}(8/15) = 28.07°$. The average value of slant $\theta$ is also equal to 28.07°.

Next, a slant normalization factor X(i) is calculated for each scan line as follows:

$$X(i) = (8.5 - i)\tan\theta \tag{11}$$

It will be noted that the value of X(i) is maximum for $i=1$ and proportionately decreases as i increases. The values of S(i) and E(i) are normalized for slant in accordance with the following equations. It will be noted that the value of P(i) is not changed.

$$S'(i) = S(i) - X(i) \tag{12}$$

$$E'(i) = E(i) - X(i) \tag{13}$$

where S'(i) and E'(i) are the slant normalized starting and ending positions. These values for the slant normalized character of FIG. 22 are shown in FIG. 21.

FIG. 19 is a flowchart of the process of translating the diagonal line from the upper left corner of the character pattern toward the lower right corner thereof to determine the point UL. In the flowchart, X is the scan line number of the point UL, giving the vertical position thereof, and S is the starting position of the point UL, giving the horizontal position thereof.

First, i and X are set equal to one, and S is set equal to the starting position of scan line $i=1$, or S(1). Next, i is incremented and S is decremented. The starting position of the next line, in this case S(2), is compared with the current value of S. If S(2) is smaller than S(1), X is set equal to $i=2$ and S is set equal to S(2). If S(2) is larger than S(1), X remains at $i=1$ and S remains at S(1). The process then loops back to increment i and decrement S, and is continued until $i=5$. For a 16×16 matrix, the point UL will most certainly be determined within the upper 5 scan lines, so the process is continued only until $i=5$. The values of X and S at the completion of the process determine UL. The processes for determining LL, UR and LR are essentially similar in concept, and will not be described in detail.

FIG. 20 illustrates an apparatus for embodying equations (12) and (13). The value of X(i) for the scan line in question is calculated as described above and stored in a register 91. A subtractor 92 subtracts X(i) from S(i) stored in the register 39 and stores the result, S'(i), in a register 93. In an essentially similar manner, a subtractor 94 subtracts X(i) from S(i) to obtain E'(i), and stores the result in a register 96.

In order to increase the correlation between a unknown character pattern and a corresponding standard character pattern, it is further desirable to normalize the horizontal position of the character pattern. FIG. 24 shows the character of FIG. 9 as normalized by being aligned with the left edge of the pattern area and FIG. 23 illustrates horizontal position normalized starting and ending positions S''(i) and E''(i) corresponding to the character of FIG. 24. The values of P(i) are not changed.

This function is accomplished by pushing the character leftwardly until it just touches the left edge of the character area, and is electronically performed by adding a constant value N to the values of S(i) and E(i). Where it is desired to align the left edge of the character with the left edge of the pattern area as illustrated, the minimum value of S(i) for all of the scan lines is determined and N is set equal to $$N = -\text{MIN } \{S(i)\} + 1 \tag{14}$$

S''(i) and E''(i) are then determined as follows:

$$S''(i) = S(i) + N \tag{15}$$

$$E''(i) = E(i) + N \tag{16}$$

Figure 25:
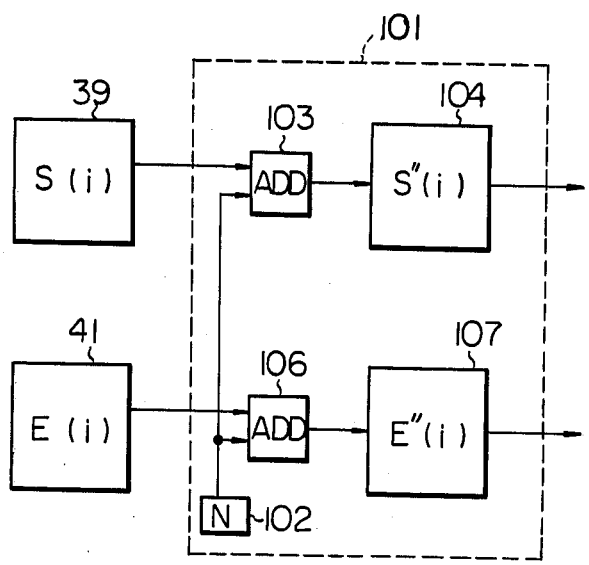
FIG. 25 is a block diagram of horizontal position normalization means of the present invention.

FIG. 25 shows a horizontal position normalization unit 101 arranged to implement equations (15) and (16). The value of N is calculated in accordance with equation (14) and is stored in a register 102. An adder 103 adds S(i) which is stored in the register 39 to N which is stored in the register 102 and stores the result, S''(i), in a register 104. In an essentially similar manner, an adder 106 adds E(i) to N and stores the result, E''(i), in a register 107.

Next, an improved quadratic identification or correlation function and means for electronically implementing the same will be described in detail. Said means are advantageously employed in the pattern comparator 46 and constitute a novel subcombination of the present invention.

Assuming that the normalized character pattern is a vector F consisting of n elements, it may be represented as:

$$F = \{f(i); i = 1 \sim n\} \tag{17}$$

A plurality of standard character patterns are provided for comparison and correlation with the unknown character pattern F, each being a vector $F^k$ which also consists of n elements and is represented as:

$$F^k = \{f^k(i); i = 1 \sim n\} \tag{18}$$

The superscript k indicates the category of the pattern, or the standard character represented by the vector $F^k$. Where the jth ($j = 1 \sim n$) characteristic vector of a convariance matrix $V^k$ of the category k is represented as $E_j^k$, and the characteristic valve is $\lambda_j^k$, $E_j^k$ is given as:

$$E_j^k = \{e_j^k(i); i = 1 \sim n\} \tag{19}$$

A quadratic identification or correlation function d(F,k) may be obtained as follows:

$$d(F,k) = \sum_{i=1}^{n} \frac{1}{\lambda_j^k} (F - F^k, E_j^k)^2 \tag{20}$$

The term $(F - F^k, E_j^k)$ represents the vector inner product and is given as:

$$(F - F^k, E_j^k) = \sum_{i=1}^{n} \{f(i) - f^k(i)\} e_j^k(i) \tag{21}$$

The character is recognized as the corresponding to the standard character or category k for which the function d(F,k) has a minimum value. The above quadratic correlation function is known in the art and produces reasonably good recognition reliability where the unknown characters are not significantly distorted.

Figure 26:
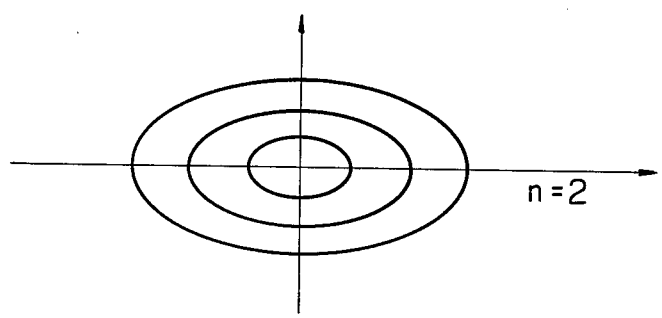
FIGS. 26a to 26b are graphs of hyperelliptic equi-value planes of quadratic correlation functions.
Figure 26:
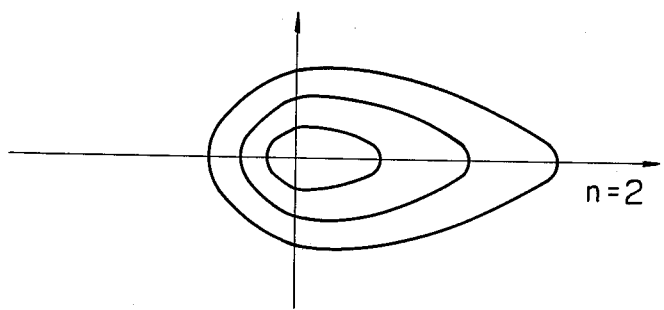

However, since the above function d(F,k) is such that it defines a hyperelliptic equivalue plane in n-dimensional space, it is designated as a hyperelliptic plane identification function. FIG. 26a shows such an equivalue plane for n=2. It will be noted that where the pattern distribution is normal, the equivalue plane of the probability of correlation of the pattern is hyperelliptic, and the pattern correlation will be satisfactory. However, the correlation is poor for distorted handwritten characters.

The present invention improves on the above function in such a manner as to considerably increase the reliability of recognizing distorted character patterns. The above characteristic value $\lambda_j^k$ represents the root mean square value of components of the pattern of category k projected on the characteristic vector $E_j^k$. Where $\lambda_j^{k1}$ represents a root mean square value of positive projection components corresponding to the character or category k projected on the characteristic vector $E_j^k$ and $\lambda_j^{k2}$ represents the root mean square value of negative projection components, the following equation holds:

$$\lambda_j^k = \lambda_j^{k1} + \lambda_j^{k2} \tag{22}$$

Where the character pattern has a normal distribution, the following applies:

$$\lambda_j^{k1} = \lambda_j^{k2} = \tfrac{1}{2}\lambda_j^k \tag{23}$$

In accordance with the present invention, the above identification function d(F,k) is improved so as to accurately recognize distorted characters:

$$d'(F,k) = \sum_{i=1}^{n} \frac{1}{2\lambda} (F - F^k, E_j^k)^2 \tag{24}$$

where $$(F - F^k, E_j^k) \geq 0, \lambda = \lambda^{k1} \tag{25}$$

and where $$(F-F^k, E_j^k)<0, \lambda=\lambda^{k2} \tag{26}$$

In the case of the improved function d'(F,k), the character is recognized as corresponding to the vector $F^k$ producing the minimum value of d'(F,k). FIG. 26b illustrates an equivalue plane of the improved function d'(F,k).

Figure 27:
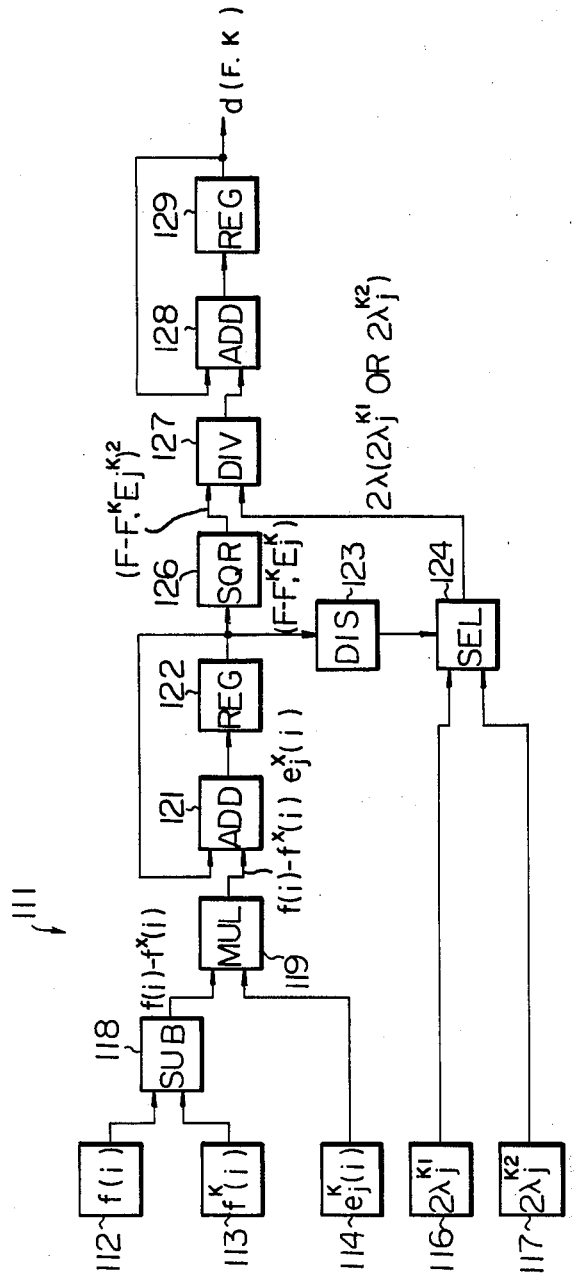
FIG. 27 is a block diagram illustrating means for embodying the operation of an improved quadratic identification function of the present invention.

FIG. 27 illustrates an electronic computing circuit 111 for implementing equations 24, 25 and 26. The values of f(i), $f^k(i)$, $e_j^k(i)$, $2\lambda_j^{k1}$, $2\lambda_j^{k2}$ are calculated and stored in registers 112, 113, 114, 116 and 117 respectively. A subtractor 118 subtracts $f^k(i)$ from f(i), and a multiplier 119 multiplies the result by $e_j^k$. An adder 121 in combination with a register 122 solve equation (21) by sequentially adding new values of $f(i)-f^k(i)e_j^k(i)$ to the accumulated total in the register 122. The value of $F-F^k$, $E_j^k$ which ultimately appears at the output of the register 122 is fed through a data distributor 123 to a selector 124 which selects $2\lambda_j^{k1}$ or $2\lambda_j^{k2}$ in accordance with the polarity of $F-F^k$, $E_j^k$ as indicated by equations 25 and 26. A squaring circuit squares $F-F^k$, $E_j^k$ and a divider 127 divides the result by $2\lambda_j^{k1}$ or $2\lambda_j^{k2}$ as determined above. An adder 128 in combination with a register 129 complete the solution of equation 24 for $j=1\sim n$ by sequentially adding new values applied to the input of the adder 128 to the accumulated total in the register 129, to provide the function d'(F,k).

In summary, it will be seen that the present invention overcomes the drawbacks of the prior art by providing improved character recognition ability by means of simplified and less costly electronic circuitry. Various modifications will become possible for those skilled in the art after receiving the teachings of the present disclosure without departing from the scope thereof. For example, a character may be horizontally aligned with the right edge or center of the character pattern area rather than with the left edge thereof as described and illustrated.

What is claimed is:

1. A character recognition apparatus comprising:
    scan means for scanning a character in a plurality of parallel scan lines;
    detector means for detecting starting and ending positions of the character in the respective scan lines;
    computing means for comparing the detected starting and ending positions with starting and ending positions of standard characters and recognizing the character as the standard character having the closest correlation between the starting and ending positions; and
    size normalization means connected between the detector means and the computing means for normalizing the horizontal size of the character through detection and alteration of the starting and ending positions;
    the size normalization means being operative to calculate a magnification factor for each scan line based on the distance between starting and ending positions of the respective scan line and adjacent scan lines, multiply the distance between the starting and ending positions of said scan line by the magnification factor to produce a normalized distance and alter the starting and ending positions of said scan line to correspond to the normalized distance.

2. An apparatus as in claim 1, in which the magnification factor is designated as $D_2(i)$ and is calculated as follows:

$$D_2(i)=K/\text{MAX}\{D(i-j), D(i-j+1), D(i+j)\}$$

where K is a standard magnification factor, MAX indicates maximum value, D is a maximum distance of the starting and ending positions of a scan line i from a predetermined position on the scan line, and j is an integer.

3. An apparatus as in claim 2, in which said predetermined position is a center of the scan line i.

4. A character recognition apparatus comprising:
    scan means for scanning a character in a plurality of parallel scan lines;
    detector means for detecting starting and ending positions of the character in the respective scan lines;
    computing means for comparing the detected starting and ending positions with starting and ending positions of standard characters and recognizing the character as the standard character having the closest correlation between the starting and ending positions; and
    position normalization means connected between the detector means and the computing means for normalizing a position of the character parallel to the scan lines through detection and alteration of the starting and ending positions;
    the position normalization means being operative to algebraically add a constant value to the starting and ending positions.

5. An apparatus as in claim 4, in which the constant value is determined in accordance with a minimum value of the starting positions.

6. An apparatus as in claim 4, in which the constant value is determined in accordance with a maximum value of the ending positions.

7. a character recognition apparatus comprising:
    scan means for scanning a character in a plurality of parallel scan lines;
    detector means for detecting starting and ending positions of the character in the respective scan lines;
    computing means for comparing the detected starting and ending positions with starting and ending positions of standard characters and recognizing the character as the standard character having the closest correlation between the starting and ending positions; and
    slant normalization means connected between the detector means and the computing means for normalizing the slant of the character through detection and alteration of the starting and ending positions;
    the slant normalization means being operative to compute an average value of slant of the character and a slant normalization value to be algebrically added to the starting and ending positions as a function of the average value of slant;
    the average value of slant being multiplied by a value which varies in proportion to a scan line number to produce the slant normalization value for the respective scan line.

8. A character recognition apparatus comprising:
    scan means for scanning a character in a plurality of parallel scan lines;

detector means for detecting starting and ending positions of the character in the respective scan lines;

computing means for comparing the detected starting and ending positions with starting and ending positions of standard characters and recognizing the character as the standard character having the closest correlation between the starting and ending positions; and slant normalization means connected between the detector means and the computing means for normalizing the slant of the character through detection and alteration of the starting and ending positions;

the slant normalization means being operative to compute an average value of slant of the character and a slant normalization value to be algebraically added to the starting and ending positions as a function of the average value of slant;

the slant normalization means being operative to detect values of slant of opposite sides of the character and compute the average value of slant as the average of the values of slant of the opposite sides of the character.

9. a character recognition apparatus comprising:

scan means for scanning a character in a plurality of parallel scan lines;

detector means for detecting starting and ending positions of the character in the respective scan lines;

computing means for comparing the detected starting and ending positions with starting and ending positions of standard characters and recognizing the character as the standard character having the closest correlation between the starting and ending positions; and size normalization means connected between the detector means and the computing means for normalizing the horizontal size of the character through detection and alteration of the starting and ending positions.

10. A character recognition apparatus comprising:

scan means for scanning a character in a plurality of parallel scan lines;

detector means for detecting starting and ending positions of the character in the respective scan lines;

computing means for comparing the detected starting ending positions with starting and ending positions of standard characters and recognizing the character as the standard character having the closest correlation between the starting and ending positions; and position normalization means connected between the detector means and the computing means for normalizing a position of the character parallel to the scan lines through detection and alteration of the starting and ending positions.

11. A character recognition apparatus comprising:

scan means for scanning a character in a plurality of parallel scan lines;

detector means for detecting starting and ending positions of the character in the respective scan lines;

computing means for comparing the detected starting and ending positions with starting and ending positions of standard characters and recognizing the character as the standard character having the closest correlation between the starting and ending positions; and slant normalization means connected between the detector means and the computing means for normalizing the slant of the character through detection and alteration of the starting and ending positions.

12. An apparatus as in claim 11, in which the slant normalization means is operative to compute an average value of slant of the character and a slant normalization value to be algebraically added to the starting and ending positions as a function of the average value of slant.

13. A character recognition apparatus comprising:

scan means for scanning a character in a plurality of parallel scan lines;

detector means for detecting starting and ending positions of the character in the respective scan lines; and computing means for comparing the detected starting and ending positions with starting and ending positions of standard characters and recognizing the character as the standard character having the closest correlation between the starting and ending positions;

the detector means being further operative to produce classification codes of portions of the character between the starting and ending positions of the respective scan lines, the computing means being further operative to compare the classification codes with classification codes of the standard characters and recognize the character as the standard character having the closest correlation between the starting and ending positions and classification codes in combination;

the detector means functioning to divide portions of the scan lines between the respective starting and ending positions into a predetermined number of equal areas and quantizing portions of the character in the areas to produce respective classification signals, the detector means producing the classification codes in accordance with the classification signals.

14. A character recognition apparatus comprising:

scan means for scanning a character and producing an electrical signal pattern F as a vector comprising n elements;

storage means for storing a plurality of standard patterns $F^k$, where k indicates a standard character corresponding to the respective pattern $F^k$;

first computing means for computing a characteristic vector $E_j^k$ of a covariance matrix corresponding to the standard character k where $j = 1 \sim n$;

second computing means for computing a root mean square value $\lambda_j^{k1}$ of positive projection components corresponding to the standard character k projected on the characteristic vector $E_j^k$;

third computing means for computing a root mean square value $\lambda_j^{k2}$ of negative projection components corresponding to the standard character k projected on the characteristic vector $E_j^k$;

fourth computing means for computing a quadric correlation function d(F,k) as follows:

$$d(F,k) = \sum_{i=1}^{n} \frac{1}{2\lambda} (F - F^k, E_j^k)^2$$

where $\lambda = \lambda_j^{k1}$ when $(F - F^k, E_j^k) \geq 0$ and $\lambda = \lambda_j^{k2}$ when $(F - F^k, E_j^k) > 0$; and decision means for recognizing the character as the standard character k for which the correlation function d(F,k) is minimum.